United States Patent [19]

Bosco et al.

[11] Patent Number: 4,714,212

[45] Date of Patent: Dec. 22, 1987

[54] PNEUMATIC TAPE TENSIONING DEVICE FOR A CASSETTE LOADING MACHINE

[75] Inventors: Angelo Bosco, San Donato; Edgardo Magnaghi, Peschiera Borromeo, both of Italy

[73] Assignee: Telefunken Robetecnica S.R.L., Sao Gio Vanni, Italy

[21] Appl. No.: 918,328

[22] Filed: Oct. 14, 1986

[30] Foreign Application Priority Data

Oct. 11, 1985 [IT] Italy ................................ 22451 A/85

[51] Int. Cl.⁴ ...................... B65H 19/20; G11B 15/58
[52] U.S. Cl. .................................... 242/182; 226/110; 242/56 R; 242/58.4
[58] Field of Search ............... 242/182, 183, 184, 185, 242/194, 56 R, 58.4, 75.2, 199; 226/109, 110

[56] References Cited

U.S. PATENT DOCUMENTS

| | | | |
|---|---|---|---|
| 3,848,825 | 11/1974 | Zielke | 242/56 R |
| 3,940,080 | 2/1976 | Bennett | 242/182 |
| 4,332,355 | 6/1982 | Zopfy et al. | 242/56 R |
| 4,372,503 | 2/1983 | Kincheloe et al. | 242/56 R X |
| 4,497,454 | 2/1985 | Woodley | 242/56 R |

Primary Examiner—Stuart S. Levy
Assistant Examiner—Joseph J. Hail, III
Attorney, Agent, or Firm—Barnes & Thornburg

[57] ABSTRACT

A pneumatic arrangement for the tensioning of a tape in a machine for loading magnetic tape onto a cassette, having a closed tensioning mechanism containing container that is under a vacuum for forming a tension loop in the tape and having curved elements for the guiding the tape at the inlet and outlet of the container, wherein the tensioning mechanism container and the outlet guiding element are pivotably mounted to be controllably moved between two indicated positions in order to be able to align the outlet guiding element at one instance, to a first processing station of the machine and, at another instance, to a second processing station of the machine without causing undesirable vibrations of the tape itself.

6 Claims, 3 Drawing Figures

PNEUMATIC TAPE TENSIONING DEVICE FOR A CASSETTE LOADING MACHINE

BACKGROUND AND SUMMARY OF THE INVENTION

This invention relates to an arrangement for the tensioning of a tape in a machine for the loading of magnetic tapes onto a cassette wherein the tape to be loaded is tensioned and directed to one of a plurality of cassette loading stations.

In these machines, a spool is used onto which the magnetic tape is spooled at many times the length of a tape that is to be loaded onto a cassette. The continuous tape may be blank or may contain a plurality of previous recordings, possibly in the form of a music program that cyclically repeats itself according to the number of the cassettes to be loaded. From this spool, the continuous tape is spooled off in order to be fed to a loading station for the cassettes. Between the spool and the loading station, a tape-tensioning arrangement is usually provided whose purpose it is to furnish the tape to the loading station at constant tension and without vibrations, so that the correct and undisturbed execution of operating sequences in said loading station is ensured.

The tensioning mechanism consists essentially of a closed container, on the inside of which a vacuum is generated and into which and out of which the tape coming from the spool enters and exits through a gap. The tensioning is obtained by forming a loop in the tape by means of a vacuum. The tensioning mechanism has curved elements for the guiding of the tape into and out of the container.

In addition to the winding-up of the portion of the tape that is intended for a cassette, various preceding and subsequent operations are also carried out in the loading stations that are known to those skilled in the art. The overall time period that each cassette remains in the loading station, increased by the time required for the exchanging of the cassettes, far exceeds the time required for the loading operation.

With the objective of better utilizing the capabilities of this type of machine and increasing its productivity up to twice the amount, it was suggested (U.S. Patent 4,332,355) to provide two operating stations in such a machine so that two cassettes may be processed from one roll, so that when the preceding and subsequent operations take place in one station, including the replacement of the just loaded cassette by an empty one, in the other station the operating sequence of the winding-up takes place on another cassette.

Since the arriving tape must be aligned perfectly with the station in which the winding-up takes place, and because, as mentioned before, in a machine of the above-mentioned type with two operating stations, the winding-up process takes place alternately in both stations, a shifting of the arriving tape becomes necessary in order to align it each time with the respective station. This shifting of the arriving tape, according to the known state of the art, was carried out by a tape-guiding fork which was placed at the outlet of the tensioning mechanism to take up one of two positions; one signifies an alignment with one station and the other signifies an alignment with the second station. Shifting of said fork took place in vertical direction to the moving direction of the tape moving through the fork It was found that this type of alignment of the arriving tape alternately with both operating stations results in several disadvantages. Indeed, the path that the tape must take through the tape-guiding fork mechanism in a relatively short distance between the outlet from the tape-tensioning arrangement and the operating stations caused strong and inadmissible vibrations to be induced in the tape (that moves at a uniform and fairly high speed) that interfere with the correct operation of the winding-up process.

It was also demonstrated that the passing through a guiding fork can result in damaging vibrations in the tape itself, which would make it advantageous for the tape to reach the processing station directly from the outlet of the tape-tensioning arrangement over a path that is as short as possible and without the tape's coming in contact with other elements.

It is an objective of the present invention to solve the problem of the necessary alignment of the arriving tape alternately with one or another of two operating stations that are provided in a machine for the loading of magnetic tapes onto a cassette, without the occurrence of the above-mentioned disadvantages.

In order to solve this problem, the position of the arriving tape in the processing stations was changed by slightly turning the plane of said tape instead of shifting the tape on the same plane. In this way no detour of the course of the tape takes place, but rather there is only a slight twist that may also be distributed over a larger distance which therefore results in no noticeable vibration or other interferences with a the high speed loading machine.

The invention provides a tape-tensioning mechaninsm in a machine for the loading of magnetic tapes onto cassettes having two operating stations and having a closed tensioning container in which a vacuum exists and into which and out of which the tape enters and exits through a gap while forming a loop. Curved elements for the guiding of the tape into the inlet and out of the outlet of the tensioning container are provided with the curved outlet element and the tensioning container itself both being mounted on a pivoted carrier. Control means are provided to command shifting of said carrier, in an angularly alternating way, into one or the other of two positions in which the curved outlet element is aligned with one or the other of the two operating stations in order to feed the tape directly to the corrected station.

These and other objects, features, and advantages of the present invention will become more apparent from the following description when taken with the accompanying drawings which show, for purposes of illustration only, an embodiment in accordance with the present invention.

DETAILED DESCRIPTION OF THE DRAWINGS

Figures 1, 2:
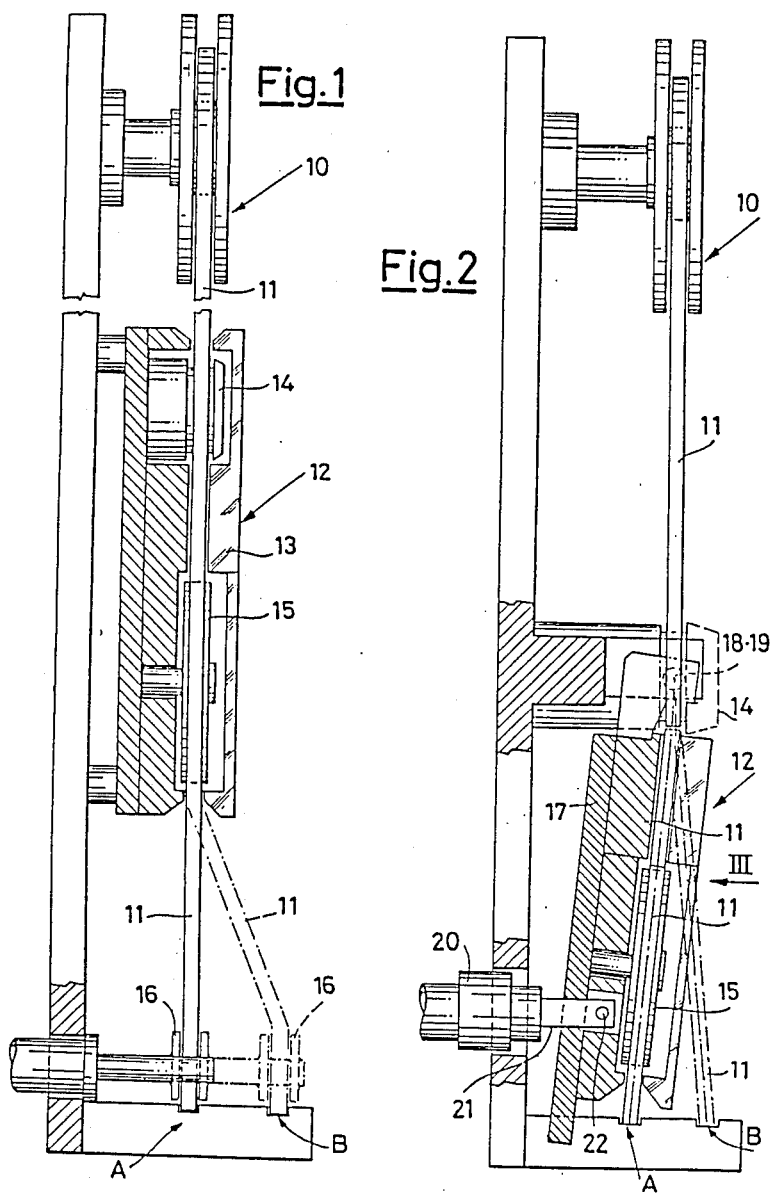
FIG. 1 is a schematic diagram of a known system.
FIG. 2 is a lateral schematic, plan sectional view of a system constructed in accordance with a preferred emobidment of the present invention.

Referring now to the drawings wherein like reference numerals are used to designate like parts and more particularly to FIG. 1, there is a spool 10 from which a tape 11 is wound off and delivered to a pneumatic tape-tensioning mechanism 12 such as is described in copending application Ser. No. 918,298, entitled: "An Arrangement For Keeping The Tension Of A Moving Tape Constant By Means Of A Vacuum Device", filed on the same date as this application, which copending application is hereby incorporated by reference into this application. This tape tensioning mechanism 12 comprises a container 13 that is essentially closed and in which a vacuum is generated that holds a loop of the tape 11 under tension and which utilizes a curved element for the guiding of the tape into the container, particularly via a fixed non-rotatable wheel 14, and which utilizes a curved element for the guiding of the tape from the tensioning mechanism, consisting particularly of a free-moving rotatable roller 15.

From the free-moving rotatable roller 15, the tape 11 passes through a tape-guiding fork 16 and from there reaches a first processing station indicated generally at A. In order to align the tape coming from the free-moving roller 15 of the tensioning mechanism 12 with a second operating station indicated generally at B, the tape-guiding fork 16 is shifted from the full line position of FIG. 1 into the position indicated by dotted and interrupted lines. Such a shifting of the tape-guiding fork 16 causes the tape 11 to receive a bend in its plane. As a result, the tape moving to the processing station experiences strong vibrations in view of the high speed at which the tape moves in the loading phase of a cassette.

Figure 3:
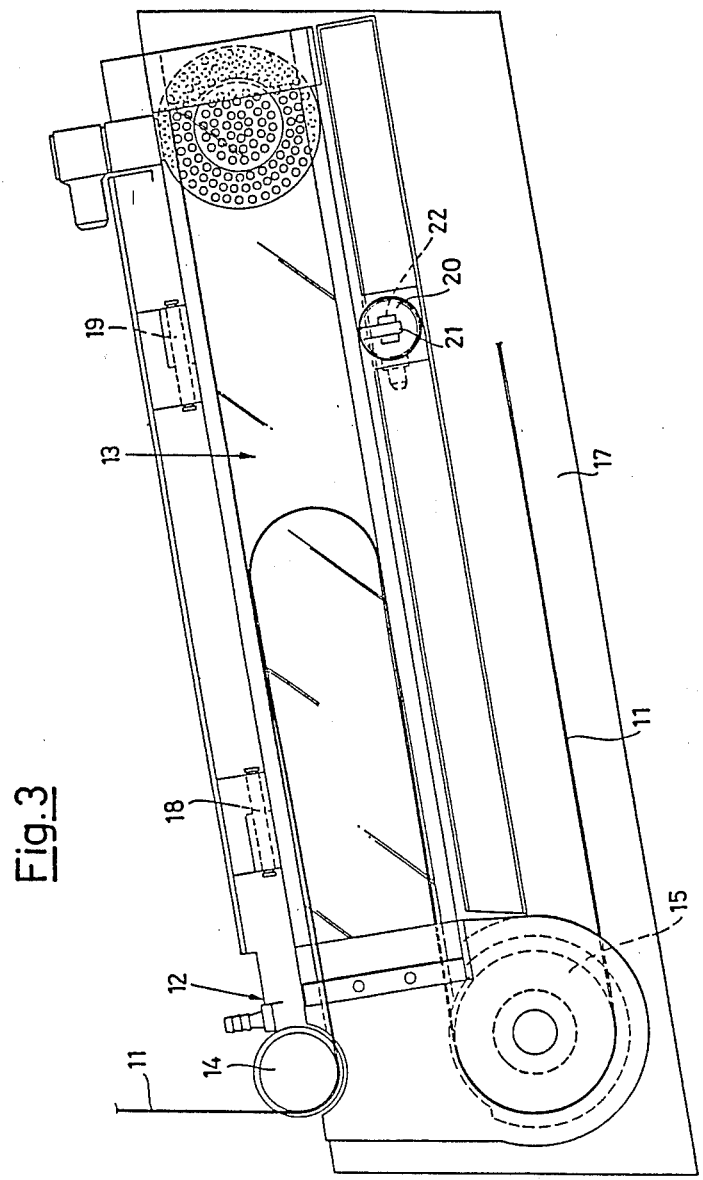
FIG. 3 is a front view of the tensioning arrangement taken in the direction of the Arrow III from FIG. 2.

In order to avoid these vibrations the system according to the invention, as shown in FIGS. 2 and 3, was developed. The spool 10 from which the tape 11 is wound off, the tape-tensioning mechanism 12 and the processing stations A and B are still there, however there is no tape-guiding fork by means of which the tape 11 is fed into the processing stations A or B directly from the arrangement 12.

In order to be able to align the tape 11 coming out of the tensioning mechanism 12 in one instant with station A and in another instant with station B, the tensioning mechanism container 13 and the curved element 15 for the guiding of the tape coming out of the container 13 housing the tape-tensioning mechanism 12 are both mounted on a joint carrier plate 17. Hinges 18, 19 mount said carrier plate 17 in a free-swinging suspended manner on a fixed part of the tape housing in order to permit a limited rotation between two extreme positions of said carrier plate. In one of said positions, the curved element 5 for the guiding of the tape from the tension mechanism is aligned with processing station A and in the other position with processing station B. In practice, said rotation of the freely movable carrier containing the tensioning mechanism 12 and the curved guide 15 signifies a limited rotation of the plane of the tape 11, but no bending or shifting of the tape on its plane. Said rotation or twist of the tape is distributed over a longer distance to eliminate noticeable vibrations or disturbances. Also the shifting occurs clockwise and counter clockwise with respect to the fixed curved inlet roller so that the angle of the tape going into the tensioner is half the angle between the two stations.

The rotation of the carrier plate 17 with the parts mounted on it may be caused by a pneumatic cylinder 20 or similar means, and has a shaft element 21 connected with the plate by means of a joint 22. Instead of this type of pneumatic cylinder, other shifting means may also be used, such as mechanical, electromagnetical or similar means.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

What is claimed is:

1. A tape-tensioning arrangement in a machine for the loading of tape onto cassettes, including a tape-tensioning mechanism located between a spool from which tape is wound off and two processing stations at which alternative loading of cassettes takes place comprising: a closed tensioning container having an inlet and outlet and on the inside of which a vacuum is utilized to tension the tape and into and out of which the tape coming from the spool enters and exits, curved elements for guiding the tape into the inlet and out of the outlet of the container, wherein said tensioning container and the respective curved element for the guiding of the tape from its outlet are both mounted on a joint carrier that is pivotally mounted, and control means are provided to angularly pivot and thus shift said carrier alternately into one or the other of two positions, aligned to one or the other of the two processing stations in order to feed the tape directly to the correct station.

2. An arrangement according to claim 1, wherein in that the means for the angular pivoting of said carrier comrpises of a linear actuator.

3. An arrangement according to claim 2, wherein in that said linear actuator comprises a cylinder and piston unit.

4. An arrangement according to claim 1, wherein the pivoted angle of the joint carrier from one station to another is twice the angle the joint carrier makes with respect to the curved element guiding the tape into the tensioning container.

5. An arrangement according to claim 2, wherein the pivoted angle of the joint carrier from one station to another is twice the angle the joint carrier makes with respect to the curved element guiding the tape into the tensioning container.

6. An arrangement according to claim 3, wherein the pivoted angle of the joint carrier from one station to another is twice the angle the joint carrier makes with respect to the curved element guiding the tape into the tensioning container.

* * * * *